United States Patent
Kim et al.

(10) Patent No.: US 8,682,313 B2
(45) Date of Patent: Mar. 25, 2014

(54) OVER-THE-AIR INTER-CELL INTERFERENCE COORDINATION METHODS IN CELLULAR SYSTEMS

(75) Inventors: Dong Hee Kim, Jeonbuk (KR); Jae Young Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 483 days.

(21) Appl. No.: 12/962,127

(22) Filed: Dec. 7, 2010

(65) Prior Publication Data
US 2011/0136494 A1    Jun. 9, 2011

(30) Foreign Application Priority Data

Dec. 8, 2009 (KR) ............................. 2009-0121065
Jan. 4, 2010 (KR) ............................. 2010-0000232

(51) Int. Cl.
*H04W 4/00* (2009.01)
*H04W 72/00* (2009.01)

(52) U.S. Cl.
USPC ...................................... 455/422.1; 455/450

(58) Field of Classification Search
USPC ................... 455/450–455; 382/133, 129, 128
See application file for complete search history.

(56) References Cited

U.S. PATENT DOCUMENTS

2006/0285503 A1* 12/2006 Mese et al. .................... 370/254
2011/0105135 A1*  5/2011 Krishnamurthy et al. .... 455/450

FOREIGN PATENT DOCUMENTS

WO        2006/095548 A1    9/2006

OTHER PUBLICATIONS

Motorola, "HeNB Interference Coordination," 3GPP TSG-RAN WG1 Meeting #59, R1-094839, retrieved online at: http://www.3gpp.org/ftp/tsg_ran/wg1_rl1/TSGR1_59/Docs/ (2009).

* cited by examiner

*Primary Examiner* — Olumide T Ajibade Akonai
(74) *Attorney, Agent, or Firm* — Nelson Mullins Riley & Scarborough LLP (57) ABSTRACT

An inter-cell interference coordination method coordinates interference between cells neighboring each other and belonging to different base stations by broadcasting interference coordination information between the neighboring cells through a broadcast channel. The terminal relays the interference coordination information between the neighboring cells over the air, so that the interference between the neighboring cells belonging to the different base stations is coordinated.

14 Claims, 5 Drawing Sheets

FIG. 1

Coordination information exchange through X2 interface

OVER-THE-AIR INTER-CELL INTERFERENCE COORDINATION METHODS IN CELLULAR SYSTEMS

CLAIM FOR PRIORITY

This application claims priority to Korean Patent Application No. 2009-0121065 filed on Dec. 8, 2009 and Korean Patent Application No. 2010-0000232 filed on Jan. 4, 2010 in the Korean Intellectual Property Office (KIPO), the entire contents of which are hereby incorporated by reference.

BACKGROUND

1. Technical Field

Example embodiments of the present invention relate to over-the-air (OTA) inter-cell interference coordination (ICIC) methods in cellular systems, for example, femto-cells (home evolved Node-Bs (eNBs)).

2. Related Art

Cellular systems need to effectively control inter-cell interference so as to improve the throughput of a system. In particular, users located in a cell edge may not secure a sufficient data transmission rate due to interference from a neighboring cell.

To increase the data transmission rate for the users located in the cell edge (hereinafter, referred to as the cell-edge users), an ICIC technique is used in long-term evolution (LTE). In cells upon scheduling, power is allocated to specific radio resources so that inter-cell interference may be reduced through coordination with neighboring cells. In general, this is called ICIC.

For the ICIC, communication for exchanging information for coordination with neighboring cells upon scheduling is necessary. If the neighboring cell is located at the same eNB, information may be exchanged without separate signaling. However, if the neighboring cell is controlled by other eNBs, separate signaling is necessary.

In an LTE downlink (DL), information of relative narrowband transmit power (RNTP) is exchanged between the eNBs through an X2 interface. The RNTP information has 1 bit indicating whether transmit power allocated according to each resource block (RB) exceeds a threshold. An RNTP value for a certain physical resource block (PRB) may be 0 or 1, wherein 0 means that the maximum transmit power of the PRB does not exceed the threshold, and 1 means that the maximum transmit power is not limited. The RNTP threshold is a parameter that determines a threshold for the above-described maximum transmit power.

The cells may know information indicating how much power is allocated to a specific RB in a neighboring cell by receiving the RNTP value of the neighboring cell, and may predict a level of interference to the RB. Since an RB has low interference if the neighboring cell allocates low power to the RB, a cell allocates high power to the RB for cell-edge users and the data transmission rate of the cell-edge users is capable of being increased.

On the other hand, since the RB has high interference if the neighboring cell allocates high power to the RB, the cell may allocate the RB for a user close to its own cell (that is, a user who is less affected by inter-cell interference) and power may be controlled to be allocated at a low level for the neighboring cell.

Likewise, for interference control of an LTE uplink (UL), eNBs exchange an overload indicator (OI) indicating an RB-specific uplink interference level. A UL OI value for a certain PRB may have a value of one of high interference, medium interference, and low interference, wherein the high interference indicates that the neighboring-cell interference of the PRB is high, the low interference indicates that the neighboring-cell interference of the PRB is low, and the medium interference indicates that the neighboring-cell interference of the PRB is medium.

For the UL interference control, the eNBs exchange a high interference indicator (HII) indicating an RB-specific UL interference level. A UL HII value for a certain PRB may be 0 or 1, wherein 0 indicates low interference sensitivity and 1 indicates high interference sensitivity.

Using the OI or HII indicating the above-described UL interference level, the cell allows the cell-edge users to use high power for a specific RB. That is, when high inter-cell interference is generated from the RB in the cell, the neighboring cell is induced to allocate the RB to a user close to its own cell (that is, a user who is less affected by inter-cell interference).

Figure 1:
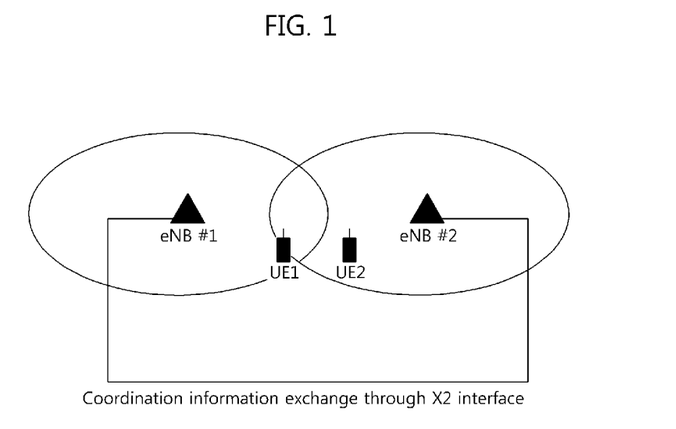
FIG. 1 is a diagram showing a method of exchanging interference coordination information between eNBs with use of an X2 interface of the related art.

In the LTE of the related art as described above, ICIC information is exchanged between the eNBs through the X2 interface. FIG. 1 shows a method of exchanging ICIC information in the related art. In the LTE of the related art, ICIC considering a signaling amount and signaling delay secured by the X2 interface is performed in a semi-static scheme (a scheme in which coordination is performed in a unit of several seconds, not in real time).

However, if the X2 interface, which supports signaling between the eNBs, does not exist, or if it is difficult to sufficiently secure signaling delay performance even when the X2 interface exists, a method capable of performing ICIC without the X2 interface is necessary. Since it is difficult to effectively apply the semi-static scheme in which coordination is performed in a unit of several seconds in an environment such as a home eNB-femto-cell where inter-cell interference is rapidly varied, a dynamic interference coordination scheme is necessary.

SUMMARY

Accordingly, example embodiments of the present invention are provided to substantially obviate one or more problems due to limitations and disadvantages of the related art.

Example embodiments of the present invention provide a method of transmitting ICIC information over the air without an X2 interface.

Example embodiments of the present invention also provide a method of dynamically supporting OTA ICIC.

In some example embodiments, a method of coordinating interference between a plurality of cells belonging to different base stations over the air in a cellular system includes coordinating inter-cell interference by broadcasting interference coordination information from a first cell belonging to a first base station to a second cell around the first cell through a broadcast channel, wherein the second cell belongs to a second base station different from the first base station.

The coordinating may include broadcasting interference coordination information including transmit power information allocated to an RB of the first cell belonging to the first base station from the first cell to peripheral cells including the second cell through the broadcast channel, and allocating, by the second cell receiving the interference coordination information, transmit power to an RB of the second cell to reduce interference between the first cell and the second cell by using the transmit power information allocated to the RB of the first cell.

The allocating may include allocating, by the second cell, low transmit power to an RB of the second cell corresponding to an RB that is transmitted by the first cell at high transmit power, and allocating, by the second cell, high transmit power to an RB of the second cell corresponding to an RB that is transmitted by the first cell at low transmit power.

The interference coordination information including the transmit power information allocated to the RB of the first cell belonging to the first base station may further include traffic load information of the first cell, and the second cell may compare a traffic load of the first cell to a traffic load of the second cell, and allocate higher power to an RB of the second cell when the traffic load of the second cell is larger.

The first and second base stations may include a femto-cell base station.

In other example embodiments, a method of coordinating interference between a plurality of cells belonging to different base stations over the air in a cellular system, includes transmitting interference coordination information from a first cell belonging to a first base station to a first terminal belonging to a coverage of the first cell, and relaying, by the first terminal, the received interference coordination information to a second cell around the first cell, wherein the second cell belongs to a second base station different from the first base station.

The transmitting may include setting, by the first cell, a desired RB to which the second cell allocates low transmit power and transmitting interference coordination information including information regarding the set RB to the first terminal, and receiving, by the second cell, the interference coordination information and allocating low power to an RB corresponding to the desired RB to which the low transmit power is allocated.

The transmitting may include setting, by the first cell, a desired RB to which the second cell allocates high transmit power and transmitting interference coordination information including information regarding the set RB to the first terminal, and receiving, by the second cell, the interference coordination information and allocating high power to an RB corresponding to the desired RB to which the high transmit power is allocated.

When the first and second cells decide to provide a service to cell-edge terminals through the same specific RB, a collision in use of RBs may be solved by priority.

The method may further include exchanging, by the first cell, interference coordination information including transmit power information allocated to an RB of the first cell with the second cell through a broadcast channel.

A high priority may be assigned to a cell where high power is allocated to an RB by using transmit power information allocated to the RB exchanged through the broadcast channel so as to solve the collision in use of the RBs.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

While the invention is susceptible to various modifications and alternative forms, specific embodiments thereof are shown by way of example in the drawings and will herein be described in detail.

It should be understood, however, that there is no intent to limit the invention to the particular forms disclosed, but on the contrary, the invention is to cover all modifications, equivalents, and alternatives falling within the spirit and scope of the invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

With reference to the appended drawings, exemplary embodiments of the present invention will be described in detail below. To aid in understanding the present invention, like numbers refer to like elements throughout the description of the figures, and the description of the same component will not be reiterated.

The term "terminal" may refer to a mobile station (MS), UE, a user terminal (UT), a wireless terminal, an access terminal (AT), a subscriber unit, a subscriber station (SS), a wireless device, a wireless communication device, a wireless transmit/receive unit (WTRU), a mobile node, a mobile, or other terms. Various example embodiments of a terminal may include a cellular phone, a smart phone having a wireless communication function, a personal digital assistant (PDA) having a wireless communication function, a wireless modem, a portable computer having a wireless communication function, a photographing device such as a digital camera having a wireless communication function, a gaming device having a wireless communication function, a music storing and playing appliance having a wireless communication function, an Internet home appliance capable of wireless Internet access and browsing, and also portable units or terminals having a combination of such functions, but the present invention is not limited thereto.

The term "base station" generally denotes a fixed point communicating with a terminal, and may be referred to as a Node-B, an eNB, a base transceiver system (BTS), an access point, and other terms. Also, one or more cells can be present at one base station.

Example embodiments of the present invention propose a method of exchanging interference coordination information between eNBs (for example, home eNBs (HeNBs)) over the air when an X2 interface is absent or if the X2 interface is difficult to secure signaling delay. The HeNB will be described hereinafter, but the present invention is applicable to a base station in a general cellular system as well as the HeNB. Here, the HeNB is a femto-cell base station. That is, an interference coordination method according to example embodiments of the present invention is applicable to exchange interference coordination information between HeNBs over the air without the X2 interface, or is applicable to exchange the interference coordination information over the air when the X2 interface is absent between a macro base station and the HeNB. According to example embodiments of the present invention, the HeNBs may exchange information in two methods and may be operated in both of the two methods.

(1) Broadcasting: An HeNB may exchange interference coordination information with a neighboring HeNB by using a broadcast channel. The HeNB should have a function of a "DL receiver" capable of receiving the broadcast channel transmitted through a DL.

(2) Relaying of UE: The UE may relay the interference coordination information. The UE may receive the interference coordination information from an HeNB to which the UE belongs through the DL and may relay the interference coordination information to neighboring HeNBs through a UL.

In example embodiments of the present invention, an OTA coordination method is provided between HeNBs by individually or simultaneously using the above-described two methods.

(1) Method by Broadcasting

Figure 2:
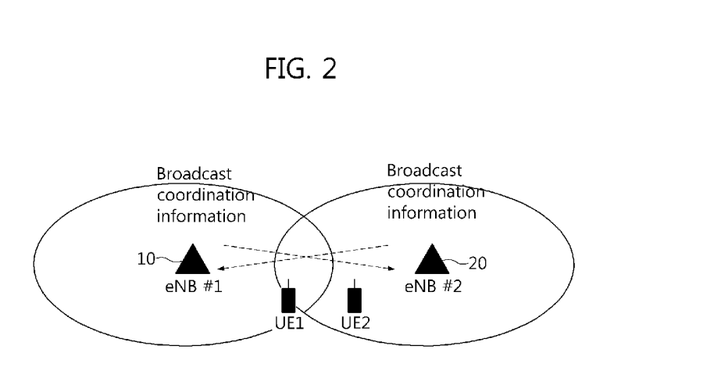
FIG. 2 is a diagram showing a method of exchanging interference coordination information through broadcasting according to example embodiments of the present invention.

As shown in FIG. 2, an OTA semi-static ICIC method by broadcasting is proposed. FIG. 2 is a diagram showing a method of exchanging the interference coordination information through broadcasting according to example embodiments of the present invention.

HeNBs 10 and 20 broadcast their own transmit power allocated to RBs through the broadcast channel. The HeNBs 10 and 20 have a DL receiver function, and receive broadcast information of peripheral cells by using the DL receiver function. An RB-specific inter-cell interference value may be predicted using transmit power information of the peripheral cells. A cell performs ICIC by allocating low transmit power to RBs that are transmitted at high transmit power by the peripheral cells and allocating high transmit power to RBs that are transmitted at low transmit power by the peripheral cells. Cells provide a service by allocating high power to as many RBs as possible when a traffic load is heavy. At this time, high interference may be generated by high power allocated to the same RB as those of the peripheral cells. To solve this problem, traffic load information is additionally transmitted through the broadcast channel, so that the cells may know the traffic load information of the peripheral cells. Each cell may allocate high power corresponding to an amount proportional to its own traffic load to the RB by comparing the traffic load with those of the peripheral cells. Thereby, it is possible to prevent a collision between RBs to which high power is allocated between cells neighboring each other. Since information to be broadcast from each eNB is updated in a relatively long cycle, not in each scheduling unit, the semi-static ICIC is performed.

The method of exchanging the interference coordination information between HeNBs over the air without the X2 interface has been described with reference to FIG. 2, but the present invention is also applicable to the case where the interference coordination information is exchanged between a macro base station and an HeNB over the air without the X2 interface in other example embodiments of the present invention.

(2) Method by Relaying of UE

Figure 3:
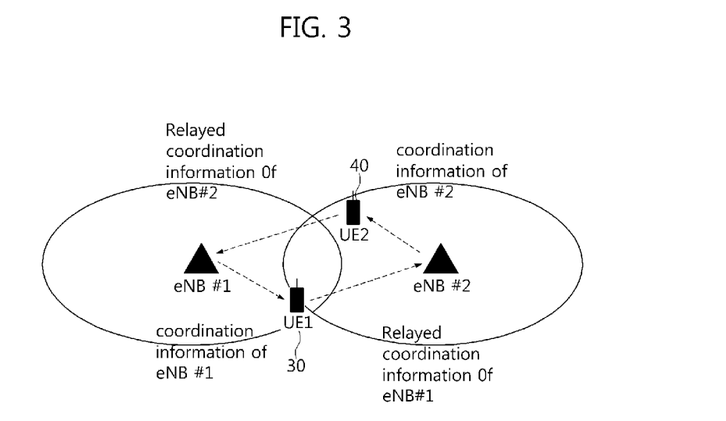
FIG. 3 is a diagram showing a method of exchanging interference coordination information with use of relaying of user equipment (UE) according to other example embodiments of the present invention.

As shown in FIG. 3, dynamic ICIC in which the ICIC may be performed in a shorter cycle in addition to the semi-static ICIC may be performed in a method by relaying of the UE. FIG. 3 is a diagram showing a method of exchanging the interference coordination information by using relaying of the UE according to other example embodiments of the present invention.

A cell sets a desired RB to which peripheral HeNBs allocate low transmit power. That is, the RB is set to provide a service to UE that is more affected by inter-cell interference. The cell transmits information regarding the RB to UE 30 or 40. The UE 30 or 40 transmits the information to peripheral cells through the UL. The peripheral cells receive the information and allocate low power to the RB.

The information to be relayed may include information indicating a valid time of a request. Once the HeNB receives a low-power allocation request, the HeNB continuously allocates low power for a period of time indicated by the relayed information. If time information is not transmitted, the low power is allocated for a predefined time.

An example of sending the low-transmit-power allocation request to peripheral HeNBs has been described above, but, in contrast, information indicating that high transmit power is allowed may be transmitted to the peripheral HeNBs through the UE.

It is possible to implement the dynamic ICIC capable of rapidly performing ICIC between cells neighboring each other through this technique based on relaying of the UE.

Since each cell decides a desired RB to which peripheral cells allocate low transmit power, not in a central control type, it may be desired that the neighboring cells should simultaneously use high power for the same RB.

That is, this is the case where cells 1 and 2 decide to provide a service to their own cell-edge UEs through the same specific RB. In this case, it should be decided which cell has priority. The HeNBs may decide the priority in advance by a specific rule. As in Method (1), the priority may be included in information to be broadcast. In Method (1), a rule may be defined so that an HeNB to transmit the RB at high power has the priority.

In another method, the priority may be decided by comparing priority parameters calculated according to a load of the HeNB, a buffer of the UE, and a traffic delay state. The priority parameters calculated as described above are relayed along with the ICIC information. If the calculated priority parameters are the same, the priority may be decided according to a predefined rule as in the case where a higher priority is allocated for a physical cell ID (PCI) having a lager value, or the like. It is possible to decide the priority according to the predefined rule without relaying the priority parameters.

An HeNB incapable of using high transmit power for the RB due to a collision may provide a service to its own UEs by reallocating other RBs.

Figure 4:
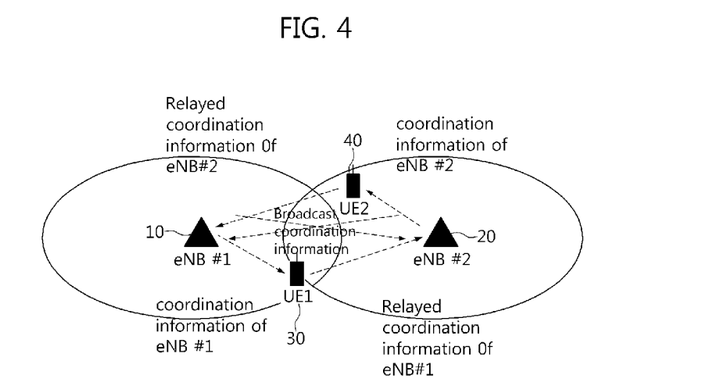
FIG. 4 is a diagram showing a method of exchanging interference coordination information with use of broadcasting and relaying of the UE according to still other example embodiments of the present invention.

The present invention proposes an OTA coordination method for reducing the above-described inter-cell interference. As shown in FIG. 4, the semi-static ICIC and the dynamic ICIC may be simultaneously used by using both broadcasting and relaying of the UE. FIG. 4 is a diagram showing a method of exchanging interference coordination information by using both the broadcasting and the relaying of the UE according to still other example embodiments.

The interference coordination method by relaying of the UE has been described with reference to FIG. 2 under the assumption that the interference coordination information is exchanged between HeNBs over the air without the X2 interface. Alternatively, an interference coordination method according to other example embodiments of the present invention is applicable to exchange the interference coordination information over the air even when the X2 interface is absent between a macro base station and the HeNB.

Figure 5:
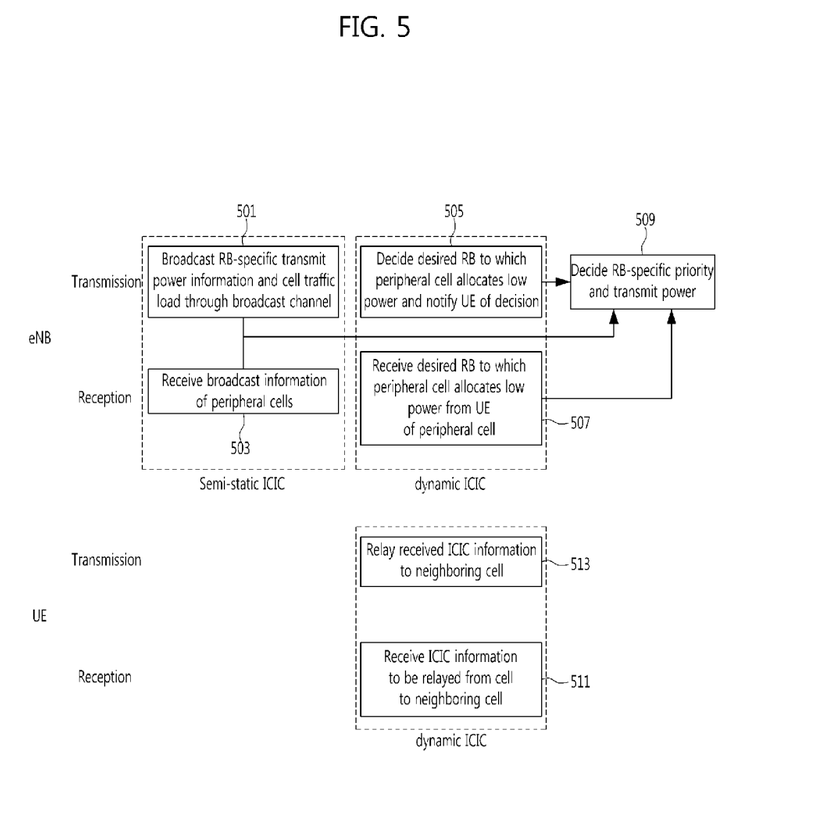
FIG. 5 is a conceptual diagram showing operations of an eNB and UE when ICIC based on a method of broadcasting and relaying of the UE is applied according to example embodiments of the present invention.

FIG. 5 is a conceptual diagram showing operations of an eNB and UE when ICIC based on a method of broadcasting and relaying of the UE is applied according to example embodiments of the present invention.

Referring to FIG. 5, the eNB for the semi-static ICIC broadcasts ICIC information including RB-specific transmit power information and cell traffic load information through a broadcast channel (step 501), and receives ICIC information of peripheral cells through a receiver (step 503).

For the dynamic ICIC, the eNB decides and transmits the ICIC information to be transmitted through the UE (step 505), and receives the ICIC information of the peripheral cells relayed by the UE of the peripheral cell (step 507). Specifically, in step 505, the eNB decides a desired RB to which the peripheral cell allocates low transmit power and notifies the UE of the decided RB. Specifically, in step 507, the eNB may receive a desired RB to which the peripheral cell allocates the low transmit power from the UE of the peripheral cell.

The eNB decides transmit power by integrating the semi-static ICIC and the dynamic ICIC. At this time, priority of the dynamic ICIC is decided using ICIC information transmitted in the semi-static ICIC such as RB-specific transmit power magnitude of the semi-static ICIC (step 509). The above-described priority-related information may be directly broadcast through the broadcast channel.

For the dynamic ICIC, the UE receives the ICIC information to be relayed from a cell to a neighboring cell (step 511), and the received ICIC information is relayed to the neighboring cell (step 513).

In example embodiments of the present invention, there is provided a method of semi-static ICIC between cells neighboring each other by broadcasting RB-specific transmit power information and an intra-cell traffic load through the broadcast channel. In other example embodiments of the present invention, there is provided a dynamic ICIC method of relaying information for requesting peripheral cells to allocate low power for an RB to be allocated to the UE, to a peripheral eNB through the UE.

In still other example embodiments of the present invention, there is provided a method of solving a collision by priority when a peripheral cell desires to allocate high power for the same RB to UEs belonging to its own cell, that is, when a low-power allocation request for the RB is received from the peripheral cell through relaying of the UE. In yet other example embodiments of the present invention, there is provided a method of determining that an HeNB of higher RB-specific transmit power broadcast through the broadcast channel has a higher priority when the priority is defined.

In the semi-static ICIC method, ICIC information such as RB-specific transmit power for the semi-static ICIC may also be shared in a method based on relaying of the UE when peripheral HeNBs do not have a "DL receiver" function or are located in a dead zone where the ICIC information transmitted through the broadcast channel may not be received.

That is, if all HeNBs do not have the "DL receiver" function, the HeNBs may transmit the ICIC information to peripheral HeNBs by selecting UEs from among UEs located in their own areas without transmitting the ICIC information through the broadcast channel and requesting the UEs to relay the ICIC information. The HeNBs select the UEs to be used for relaying by checking neighboring-cell information of the UEs. If a relaying request does not occupy many radio resources, the relaying request may be sent to an unspecified number of UEs. The HeNB sets the relay UE and delivers its own ICIC information (RB-specific transmit power, a cell load, or the like) to the UE. The UE delivers the received information to the peripheral HeNBs. Upon delivery, the UE may deliver the information by establishing an individual connection to each HeNB. The UE may simultaneously deliver the information to the peripheral HeNBs in a pre-defined connection type.

If some of the HeNBs have the "DL receiver" function, the HeNB transmits the ICIC information through the broadcast channel. It is possible to send a relaying request to a specific UE for the HeNB not having the "DL receiver." At this time, since the ICIC information has been broadcast and the UE has already received the information, it may not be necessary to perform separate transmission to the UE.

Figure 6:
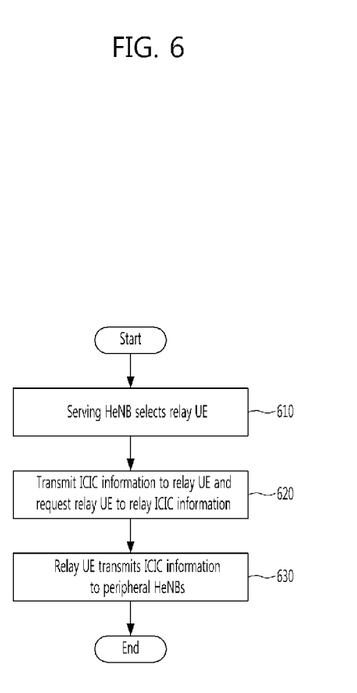
FIG. 6 is a flowchart of an ICIC method through relaying of the UE according to other example embodiments of the present invention.

FIG. 6 is a flowchart of an ICIC method through relaying of the UE according to other example embodiments of the present invention.

Referring to FIG. 6, a serving HeNB selects a relay UE (step 610), and transmits ICIC information to the relay UE and requests the relay UE to relay the ICIC information (step 620). The relay UE transmits the ICIC information to peripheral HeNBs through the UL (step 630). A difference of the example embodiment of FIG. 6 from that of FIG. 3 is that only ICIC information related to an RB of the UE to receive a service is relayed in FIG. 3, but the ICIC information to be relayed in the example embodiment of FIG. 6 is any information that the HeNB desires to share without being limited to a specific RB.

Figure 7:
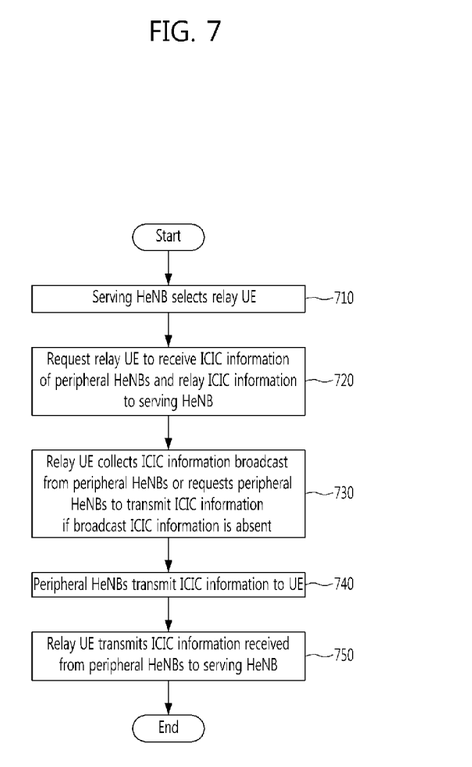
FIG. 7 is a flowchart of an ICIC method through relaying of the UE according to still other example embodiments of the present invention.

The HeNB may request a specific or unspecified UE to receive ICIC information of peripheral HeNBs (see FIG. 7). The UE receiving the request may relay the ICIC information to the requesting HeNB by receiving the ICIC information broadcast from the peripheral HeNBs. Alternatively, if the peripheral HeNBs do not broadcast the ICIC information, the UE receiving the request may relay the ICIC information to the requesting HeNB by directly requesting the peripheral HeNBs to transmit the ICIC information and receiving the ICIC information (see FIG. 7).

FIG. 7 is a flowchart of an ICIC method through relaying of the UE according to still other example embodiments of the present invention. Referring to FIG. 7, a serving HeNB selects a relay UE (step 710), and the serving HeNB requests the relay UE to receive ICIC information from peripheral HeNBs and relay the ICIC information of the peripheral HeNBs to the serving HeNB (step 720). The relay UE collects the ICIC information broadcast from the peripheral HeNBs or requests the peripheral HeNBs to transmit the ICIC information if the broadcast ICIC information is absent (step 730). The peripheral HeNBs transmit the ICIC information to the UE (step 740), and the relay UE transmits the ICIC information received from the peripheral HeNBs to the serving HeNB (step 750).

As described in "2) Method by Relaying of UE" in the dynamic ICIC method, it is possible not only to relay ICIC information so that peripheral HeNBs decrease (or increase) transmit power limited to an RB allocated to the UE, but also to transmit ICIC information of a universal purpose such as ICIC information for other RBs as well as the RB allocated to the UE, priority, or a traffic amount.

When one UE receives ICIC information from two HeNBs (that is, receives ICIC information A from HeNB1 and receives ICIC information B from HeNB2) and relays the ICIC information to the opposite HeNBs (that is, relays the information A to HeNB2 and relays the information B to HeNB1) in the case where the UE relays the ICIC information as described above, it may be effective for the UE to deliver two information pieces A and B by performing network coding of the two information pieces A and B. That is, if C $(=A^U B$, where $^U$ is a modulo-2 operation) is transmitted in place of respectively transmitting the information pieces A and B to HeNB2 and HeNB1, HeNB2 may recover the information A by receiving $C^U B$ since HeNB2 knows the information B and HeNB1 may recover the information B by receiving $C^U A$ since HeNB1 knows the information A. Once the UE transmits the information C, the two HeNBs may receive the information A and the information B at once.

In the above-described example embodiments of the present invention, information for requesting peripheral cells to allocate low power to an RB to be allocated by the UE is relayed through the UE for the dynamic ICIC. Alternatively, it is possible to include other scheduling-related information necessary for ICIC such as information for requesting the peripheral cells to allocate high power, information for requesting the peripheral cells to use, or not to use, a corresponding RB, or the like.

The DL ICIC has been described in the above-described example embodiments of the present invention, but UL ICIC information may be broadcast, or may be relayed by the UE, with use of the same method.

According to the example embodiments of the present invention, an ICIC method may coordinate interference between cells neighboring each other and belonging to different base stations by broadcasting interference coordination information between the neighboring cells through a broadcast channel.

The terminal relays the interference coordination information between the neighboring cells over the air, so that the interference between the neighboring cells belonging to the different base stations may be coordinated.

While the example embodiments of the present invention and their advantages have been described in detail, it should be understood that various changes, substitutions and alterations may be made herein without departing from the scope of the invention.

What is claimed is:

1. A method of coordinating interference between a plurality of cells belonging to different base stations over the air in a cellular system, comprising:
   coordinating inter-cell interference, the coordinating including: broadcasting interference coordination information from a first cell belonging to a first base station to a second cell around the first cell through a broadcast channel, wherein the second cell belongs to a second base station different from the first base station,
   wherein the coordinating includes: broadcasting interference coordination information including transmit power information allocated to a RB (Resource Block) of the first cell belonging to the first base station from the first cell to peripheral cells including the second cell through the broadcast channel; and
   allocating, by the second cell receiving the interference coordination information, transmit power to a RB (Resource Block) of the second cell to reduce interference between the first cell and the second cell by using the transmit power information allocated to the RB of the first cell.

2. The method of claim 1, wherein the allocating includes:
   allocating, by the second cell, low transmit power to a RB (Resource Block) of the second cell corresponding to a RB (Resource Block) that is transmitted by the first cell at high transmit power; and
   allocating, by the second cell, high transmit power to a RB (Resource Block) of the second cell corresponding to a RB (Resource Block) that is transmitted by the first cell at low transmit power.

3. The method of claim 1, wherein:
   the interference coordination information including the transmit power information allocated to the RB of the first cell belonging to the first base station further includes traffic load information of the first cell, and
   the second cell compares a traffic load of the first cell to a traffic load of the second cell, and allocates higher power to a RB (Resource Block) of the second cell when the traffic load of the second cell is larger.

4. The method of claim 1, wherein the first and second base stations include a femto-cell base station.

5. A method of coordinating interference between a plurality of cells belonging to different base stations over the air in a cellular system, comprising:
   selecting, by a first base station belonging to a first cell, a first terminal belong to a coverage of a second cell belonging to a second base station peripheral to the first cell;
   requesting, by the first base station, the first terminal to receive interference coordination information from the second cell belonging to the second base station; and
   receiving, by the first base station, the interference coordination information from the first terminal, wherein the second cell belongs to a second base station different from the first base station, wherein the coordinating includes:
   broadcasting interference coordination information including transmit power information allocated to a RB (Resource Block) of the first cell belonging to the first base station from the first cell to peripheral cells including the second cell through the broadcast channel; and allocating, by the second cell receiving the interference coordination information, transmit power to a RB (Resource Block) of the second cell to reduce interference between the first cell and the second cell by using the transmit power information allocated to the RB of the first cell.

6. The method of claim 5, wherein the interference coordination information includes information on a desired RB to which the first cell allocates low transmit power.

7. The method of claim 5, wherein allocated, the interference coordination information includes information on a desired RB to which the first cell allocates high transmit power.

8. The method of claim 5, wherein, when the first and second cells decide to provide a service to cell-edge terminals through the same specific RB, a collision in use of RBs is solved by priority.

9. The method of claim 8, further comprising exchanging, by the first cell, interference coordination information including transmit power information allocated to an RB of the first cell with the second cell through a broadcast channel.

10. The method of claim 9, wherein a high priority is assigned to a cell where high power is allocated to an RB by using transmit power information allocated to the RB exchanged through the broadcast channel so as to solve the collision in use of the RBs.

11. The method of claim 8, wherein the priority is decided by comparing priority parameters calculated according to at least one of a load of the base station, a buffer of the terminal, and a traffic delay state by a predefined rule.

12. The method of claim 11, wherein, when the priority parameters are identical, a predefined rule is applied so that a higher priority is assigned for a larger PCI (Physical Cell ID) value.

13. The method of claim 5, wherein the interference coordination information includes information indicating a valid time of an interference coordination request.

14. The method of claim 5, wherein, when the first terminal receives first interference coordination information from the second base station and receives second interference coordination information from a third base station different from the second base station, the first terminal relays the first interference coordination information and the second interference coordination information by performing network coding operation on the first interference coordination information and the second interference coordination information.

* * * * *